INVENTOR
Philip A. Hoffman,
BY Diggins & Le Blanc
ATTORNEYS

July 6, 1965                P. A. HOFFMAN                3,193,803
                        ELECTRONIC MULTIPLEXER
Filed Nov. 15, 1960                              4 Sheets-Sheet 3

INVENTOR
Philip. A. Hoffman,
BY Diggins + Le Blanc
ATTORNEYS

Fig. 8

United States Patent Office 3,193,803
Patented July 6, 1965

3,193,803
ELECTRONIC MULTIPLEXER
Philip A. Hoffman, Towson, Md., assignor to Hoffman and Eaton, Towson, Md., a partnership
Filed Nov. 15, 1960, Ser. No. 69,454
14 Claims. (Cl. 340—173)

The present application is a continuation-in-part of application Serial No. 25,343, filed April 28, 1960, now U.S. Patent No. 3,098,224.

This invention relates to an electronic multiplexer, or commutating system, and more particularly to electronic circuits useful in sequentially connecting or transforming several analog information sources to a common information output terminal.

Multiplexers, or commutators, are well known and are used in the field of telemetry for connecting a plurality of information sources such as a transducer for measuring acceleration, air speed, temperature and the like to the input of a transmission system. The output of the multiplexer is a voltage step for each transducer input, the amplitude of each step representing the quantity being measured at that instant. This output may be applied to an analog to digital converter to convert the information into a suitable pulse code for transmission, or the voltage steps may be applied directly to a carrier transmitting system wherein the carrier frequency or amplitude is some function of the transducer amplitude. In other fields, multiplexers are used in the transmission over a one wire transmitter of several voice or teletype messages.

The multiplexer of the present invention accepts electrical quantities such as voltages or currents as inputs. The output of the multiplexer is a voltage wave which, at an appropriate time, is proportional to one of the inputs. An important feature of the present invention is that the proportionality constant may be different for different inputs to the multiplexer. Important features of the novel multiplexer involve significant improvements in the permissible information source impedances and voltage levels, freedom of selection of different gains for different channels, the capability of simultaneous sampling of the information sources, simplicity and high accuracy.

It is therefore a primary object of the present invention to provide an improved electronic multiplexer.

Another object of the present invention is to provide electronic apparatus wherein a plurality of input voltage or current sources may be caused to produce voltages or currents at a single output terminal in time sequence with the output proportional to the magnitudes of the individual inputs.

Another object of the present invention is to provide an arrangement for switching from one information source to another information source at high speed.

Another object of the present invention is to provide a multiplexer wherein the ratio between the input voltage or current of the multiplexer and a corresponding output may be chosen independently of the gain values for other channels.

Another object of the present invention is to provide a multiplexer wherein output voltages or currents of the multiplexer may be related to their corresponding input voltages or currents in a controllable non-linear manner.

Another object of the present invention is to provide an electronic multiplexer in which information sources may be sampled simultaneously or in sequence.

These and further objects and advantages of the invention will become more apparent upon reference to the following specification and claims and appended drawings wherein:

The multiplexer of the present invention provides an arrangement for the precise commutating of electrical signals by the use of electrical charge transfer. Each of the analog input signals charges an input storage capacitor or delay line to the potential of the corresponding input signal and the resulting charges are transferred in sequence to an output capacitor. The unit has facilities for the intermediate storage of the analog input signals and, as a result, simultaneous sampling of the input voltages is possible with sequential transfer of the charges to the output capacitor. In addition, individual scale factor adjustments can be made for each channel by choosing appropriate values for the intermediate storage devices.

Figure 1:
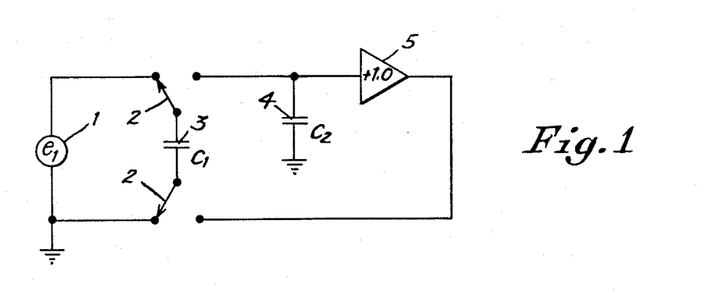
FIGURE 1 shows a basic charge transfer circuit usable in the multiplexer of the present invention.

Referring to the drawings in FIGURE 1, a capacitor 3 labeled $C_1$ is connected to the two arms of a double-pole-double-throw switch 2. One pair of stationary terminals of switch 2 is connected to a voltage source 1 which has a voltage output $e_1$. The other pair of stationary terminals is connected to a second capacitor 4 labeled $C_2$ and to the output of an amplifier 5 as shown. The gain of the amplifier is 1.0 which means that the output potential is equal to the input potential in both magnitude and phase. More particularly, the voltage gain is unity when no current is being drawn from the amplifier.

The circuit in FIGURE 1 has the special property that, if the arms of switch 2 are moved to the left-hand contacts so that capacitor 3 is charged to the voltage $e_1$ of the voltage source and then if the arms of the switch are moved to the right-hand contacts, all of the charge on capacitor 3 is transferred to capacitor 4. Consequently, if the capacity of capacitor 3 is $C_1$ and the capacity of capacitor 4 is $C_2$, the voltage across capacitor $C_2$ changes by an amount $$\frac{C_1}{C_2} e_1$$

and this result occurs regardless of the initial charge on capacitor $C_2$. In particular, if the initial voltage on capacitor $C_2$ is $e_0$, the voltage on $C_2$ after the arms of switch 2 have moved to the right-hand position is $$\frac{C_1}{C_2} e_1 + e_0$$

Therefore, the gain of the circuit may be considered to be $C_1/C_2$.

Figure 2:
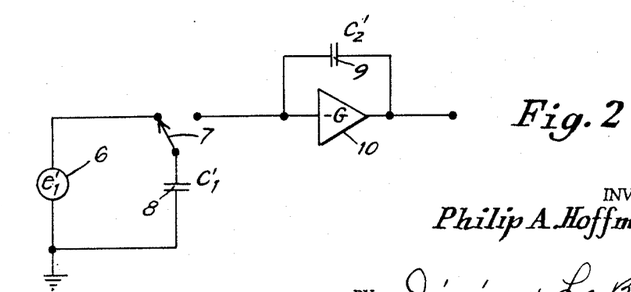
FIGURE 2 shows a second basic charge transfer circuit usable in the multiplexer of the present invention.

Another basic circuit for transferring charges between capacitors is shown in FIGURE 2. In this circuit, capacitor 8 labelled $C_1'$ is connected to the arm of a single-pole-double-throw switch 7 and to ground. One of the stationary terminals of switch 7 is connected to a voltage source 6 which has a voltage $e_1'$. The other stationary switch terminal is connected to a second capacitor 9 labelled $C_2'$ and to the input terminal of amplifier 10. The other terminal of capacitor 9 is connected to the amplifier output. The gain G of the amplifier 10 is much greater than unity and the amplifier inverts any input voltage that is applied to it; that is, a positive voltage increment applied to the input of the amplifier causes a negative increment to occur in the output voltage of the amplifier, and vice versa.

The circuit in FIGURE 2 has the special property that, if the arm of switch 7 is moved to the left-hand contact, capacitor 8 is charged to the voltage $e_1'$ of the voltage source 6, and then if the arm of the switch is moved to the right-hand contact, essentially all of the charge on capacitor 8 is transferred to capacitor 9. Consequently, if the capacity of capacitor 8 is $C_1'$ and the capacity of capacitor 9 is $C_2'$, the voltage across capacitor $C_2'$ changes by an amount $$\frac{C_1'}{C_2'}e_1'$$

and this result occurs regardless of the initial charge on capacitor $C_2'$. This effect takes place because the amplifier 10 input is held at a virtual ground potential by feedback action. Because of this action, the potential on $C_1'$ drops and approaches zero; in fact, it equals approximately $e_1'/G$ when equilibrium is established and when $C_1'=C_2'$. The output voltage is then approximately $$\frac{e_1'}{G} \times G \text{ or } e_1'$$

The voltage across $C_2'$ is then equal to $$e_1'\left(\frac{1-G}{G}\right)$$

If G is very large in comparison with unity, this expression becomes very nearly $-e_1'$.

Figure 3:
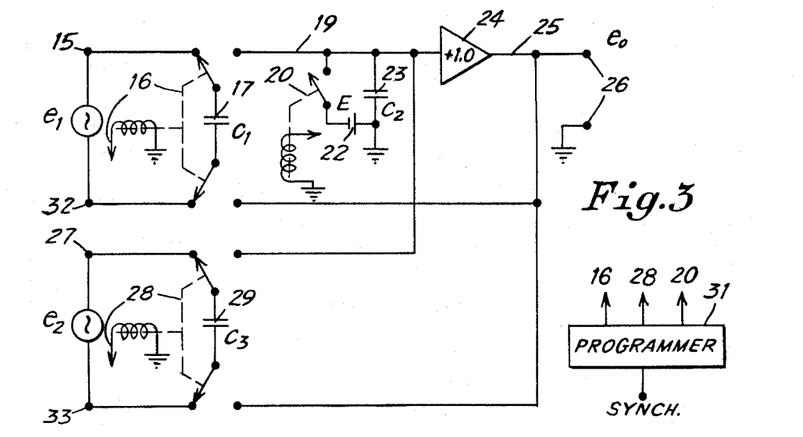
FIGURE 3 illustrates a simplified multiplexer utilizing the basic circuit of FIGURE 1.

The actions illustrated by FIGURES 1 and 2 are used in the multiplexer of the invention to transfer the charge in sequence from a plurality of capacitors associated with the input channels to a single capacitor in the output system. The charge on the latter capacitor is held for whatever time is required by the transmission system, and is then removed before the next input channel capacitor is connected for similar action. A system to accomplish this particular method for two channels is illustrated by FIGURE 3. The circuit in FIGURE 3 is particularly useful when inputs are balanced or not referenced to ground, although ground-referenced inputs may be used by simply connecting the appropriate input terminal of an input pair to ground. Although this figure shows only two input channels, it is obvious that additional channels may be readily added as desired.

In FIGURE 3, switch 16 is a double-pole-double-throw type with capacitor 17 connected between the moving contacts. The left-hand pair of fixed contacts are connected to input terminal pair 15 and 32 which are in turn connected to one information channel input. The upper right-hand fixed contact of switch 17 is connected to the fixed contact on switch 20, the upper plate of storage capacitor 23, the input of unity gain amplifier 24, and the corresponding terminals of the switches associated with additional input channels such as switch 28. The arm of switch 20 is connected to ground or to a battery voltage 22 which establishes an initial condition of charge for capacitor 23 in case such a condition is desired. The lower plate of capacitor 23 is connected to ground. The moving contacts of switch 28 are connected to capacitor 29. The left-hand contacts of this switch are connected to input terminal pair 27 and 33 which are in turn connected to a second information input. Switches 16, 20 and 28 are actuated by pulses generated within a programming unit 31 which may be a part of the multiplexer or which may be replaced by an external circuit which will supply the necessary operating voltages. A simple type of programmer utilizing a conventional stepping switch may be employed. On the other hand, a conventional electronic programmer may be used.

Figure 5:
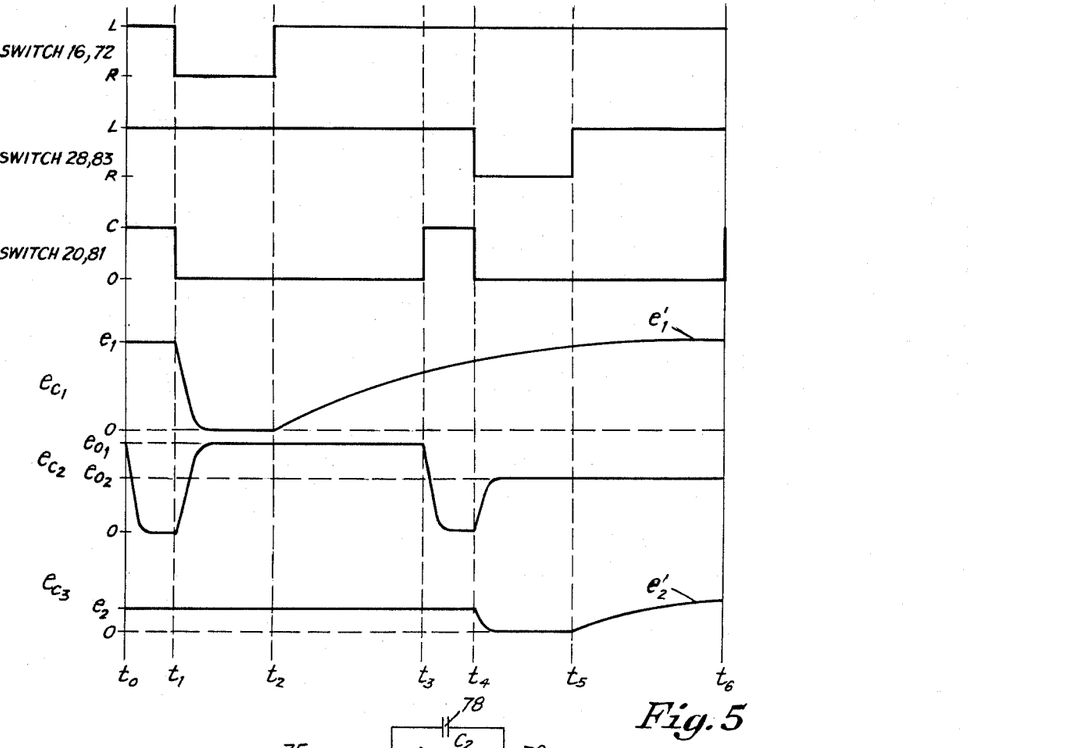
FIGURE 5 shows the voltage wave forms at various points in the circuits of FIGURES 3 and 4.

FIGURE 5 shows the operating sequence for the switches of the multiplexer systems shown in FIGURE 3 as well as typical voltage waveforms for the systems. The switch waveforms illustrate a double-throw switch operated to the left by an upward excursion and to the right by a downward excursion. Similarly, a single-throw switch is closed when the waveform is up and open when it is down. These waveforms may thus be interpreted as also representing the operating voltages applied to the switches. Although the switches shown in this and associated figures are illustrated as relay types, other types of switches, such as electronic devices, may be readily employed.

The circuit shown in FIGURE 3 may be operated in two different modes. In one mode, switches 16 and 28 are opened simultaneously. Thus the sources to which the switches are connected are sampled simultaneously, which is an advantage in some applications. In this mode of operation, the charges on capacitors 17 and 29 are transferred to capacitor 23 sequentially as will be explained in more detail below. In general, switches 16 and 28 are closed at the same time, but this is not necessary. The important point is that these switches are opened simultaneously. In the other mode of operation, switches 16 and 28 are opened sequentially. That is, the contacts of each switch remain in the left-hand positions. One of the switches is then moved to the right-hand position, and the charge on its associated capacitor is transferred to capacitor 23. This mode of operation allows the leakage current in the switch to be larger, which is advantageous under some conditions.

The operation of the multiplexer shown in FIGURE 3 is as follows for sequential sampling of the information sources. The arms of input switches 16 and 28 as well as any additional input channel switches are normally closed to the left. This connects each of the input capacitors 17, 29 and any others to their associated information inputs. Each of these capacitors accumulates a charge proportional to the input voltage $e_1$ and $e_2$ etc., and its corresponding capacitance.

For purposes of simplification, this explanation illustrates the case of voltage inputs although corresponding relationships exist for the case of current inputs. The situation corresponding to time $t_0$ may be considered as the start of a typical multiplexing program. Switches 16 and 28 are to the left while switch 20 is at this time closed. The voltage on capacitor 23 is thereby reduced to zero or to the battery 22 potential if an initial voltage condition is desired. At time $t_1$ switch 20 opens and switch 16 closes to the right-hand pair of contacts. Through the action previously described with respect to FIGURE 1, all the charge is removed from capacitor 17 or $C_1$ and is transferred to capacitor 23 or $C_2$. This causes an output voltage $e_{01}$ to appear at the amplifier output terminal 26. This voltage, as previously explained, has the relationship $$e_{0_1}=e_1\frac{C_1}{C_2}$$

assuming that the battery 22 is not used. Switch 16 operates to the left-hand terminals at some later time $t_2$ when the operation of charge transfer has been completed. The charge on capacitor 23 remains until switch 20 is again operated at time $t_3$ thereby removing the charge or again establishing an initial potential equal to that of the battery 22. After switch 20 opens, switch 28 closes to the right-hand pair of contacts. As before, the charge on capacitor 29 or $C_3$ is transferred to capacitor 23 or $C_2$. This produces an output voltage $e_{o2}$ at the amplifier output terminals 26. This voltage is equal to $$e_2 \frac{C_3}{C_2}$$

(for zero battery voltage). Switch 28 returns to the left-hand contacts at some later time $t_5$ and at a still later time $t_6$ another channel can be sampled or the same cycle may repeat itself. As shown on FIGURE 5, while the second channel represented by switch 28 is being transferred and processed, the first channel capacitor 17 is charging, starting at time $t_2$ to some new value of input potential $e_1$ for the first channel. Similarly, capacitor 29 starts charging at time $t_5$ to some new input potential $e_2$ for the second channel.

The above description is for application of the device as a multiplexer in which the output is linearly related to the inputs by constant gain factors which may differ for individual channels. That is, the gain factor is determined by the ratio $C_1/C_2$ for the first channel, $C_3/C_2$ for the second channel, and so forth for additional channels.

Another area of application arises in those cases where it is desired that the output be some predetermined non-linear function of the input. This interest arises at times with regard to handling inputs from certain types of transducers such as strain gauges and thermocouples, etc. where the output may not be a linear function of the applied quantity that is being measured. Another important application is in the field of communication where it is frequently desired to compress or expand the loudness range, commonly known as the dynamic range, of one or more communication channels. This can be accomplished simultaneously with multiplexing by introducing capacitors whose capacitance is a function of their applied voltage in either or both of the $C_1$ or $C_2$ positions.

The amount of expansion or compression can be altered by making the voltage-sensitive capacitance some fraction of the total capacitance by simply adding in parallel appropriate values of fixed capacitors.

Figure 4:
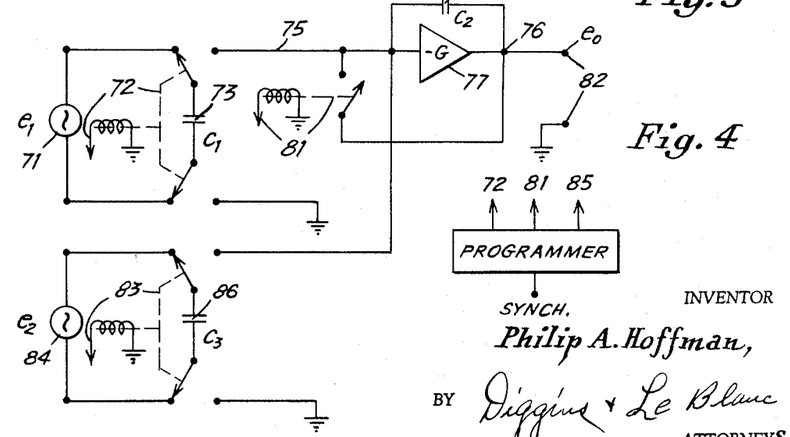
FIGURE 4 shows a simplified multiplexer utilizing the basic circuit of FIGURE 2.

Another form of multiplexer which employs the charge transfer principle referred to previously with reference to FIGURE 2 is shown in FIGURE 4. This form lends itself to the same applications and variations previously described with regard to the multiplexer shown in FIGURE 3. The multiplexer shown in FIGURE 4 has the advantage of being somewhat simpler for inputs referenced to ground in that fewer switches are required. That is, for grounded inputs, the lower arms and contacts of switches 72 and 83 may be omitted, and the lower plates of capacitors 73 and 86 may be connected to ground. For ungrounded inputs, switch 72 is a double-pole-double-throw type with capacitor 73 connected between the moving contacts. The left-hand pair of fixed contacts are connected to the input terminals 71. The upper right-hand fixed contact is connected to the input of amplifier 77 and to the fixed contact on switch 81, the corresponding upper right-hand fixed contact of switch 83 and one plate of storage capacitor 78. The lower right-hand fixed contacts of switches 72 and 83 are connected to ground. The moving contact of switch 81 is connected at 76 to the output terminal of amplifier 77. The other plate of capacitor 78 is connected to the output terminal 76 of the amplifier 77 and one of the output terminals 82 of the multiplexer. The other output terminal for the multiplexer is connected to ground. The left-hand fixed contacts of switch 83 are connected to the second pair of input terminals 84. The input capacitor 86 for the second input is connected between the moving contacts of switch 83. The operating coils of switches 72, 81 and 83 are connected to the appropriate outputs of the programmer 87. The amplifier 77 has a negative gain much greater than unity, a high input impedance, a low output impedance, and a frequency response characteristic consistent with the desired speed of operation of the multiplexer system.

The operation of the device of FIGURE 4 is based on the transfer of charge from capacitors 73 and 86 to capacitor 78 as described in connection with FIGURE 2 and its associated references. FIGURE 5 (which was also used in connection with FIGURE 3) shows the switch timing and typical operating voltages. As explained previously, an excursion upward means that a double-pole-double-throw switch is closed to the left-hand contacts and a downward excursion means that the switch is closed to the right. Similarly, an upward excursion means that a single throw switch is closed and a downward excursion means that it is open. Time $t_0$ may be considered to represent the start of a typical multiplexing cycle. At this time, switches 72 and 83 are both to left and their respective input capacitors 73 and 86 are charged to a potential equal to that applied to the input terminals 71 and 84. For purposes of simplification, this explanation illustrates the case of voltage inputs, although corresponding relationships exist for current inputs. At this same time $t_0$ switch 81 closes. This grounds the amplifier input and thereby discharges capacitor 78 since the output terminal of the amplifier is also brought to ground potential. The amplifier 77 can be designed to maintain its initial balance conditions wherein zero input results in zero output potential. Methods for accomplishing this balance and maintaining the balanced conditions are well known.

As shown in FIGURE 5, switch 81 opens at time $t_1$ and switch 72 closes to the right. This action connects capacitor 73 between ground and the amplifier input. Through the action described with reference to FIGURE 2, the charge on capacitor 73 or $C_1$ is transferred to capacitor 78 or $C_2$. The output voltage appearing across terminals 82 is now equal to $$-e_1 \frac{C_1}{C_2}$$

since essentially all the charge on $C_1$ is transferred to $C_2$. Switch 72 operates to the left-hand terminals at some later time $t_2$ when the operation of charge transfer has been completed. The charge on capacitor 78 remains until switch 81 is again operated at time $t_3$. At this time the action of switch 81 removes the charge from capacitor 78. At time $t_4$ switch 81 opens and switch 83 closes to the right-hand pair of contacts. This connects capacitor 86 or $C_3$ between the amplifier input and ground. As before, the charge on capacitor 86 is transferred to capacitor 78 and an output voltage results which is equal to $$-e_2 \frac{C_3}{C_2}$$

Switch 83 returns to the left-hand contacts at time $t_5$ and at still a later time $t_6$ another channel can be sampled or the same cycle may repeat itself. As shown on FIGURE 5, while the second channel, represented by switch 83, is being transferred and processed, in the first channel capacitor 73 is charging to some new value of input potential $e_1'$, for the first channel. Similarly, capacitor 86 starts charging at time $t_5$ to some new input potential $e_2'$ for the second channel.

The foregoing explanations have applied to the sequential sampling mode of operation. For simultaneous sampling, switches 16, 28, etc. in FIGURE 3, or switches 72, 83, etc. in FIGURE 4 are opened simultaneously. The switch timing diagrams for this mode of operation are slightly different from FIGURE 5, but the differences are readily apparent from the previous explanations.

It can be seen that a limitation on the speed of operation of the circuit of FIGURE 1, for example, is the time required for capacitor 3 to charge up through the internal impedance of the information source 1. In the case of alternating or varying voltages, there may be a limitation on the product of $RC_1$, where R represents the resistance of the information source 1 in FIGURE 1. These limitations may be made much smaller by the substitution of a delay line for capacitor $C_1$.

Figure 6:
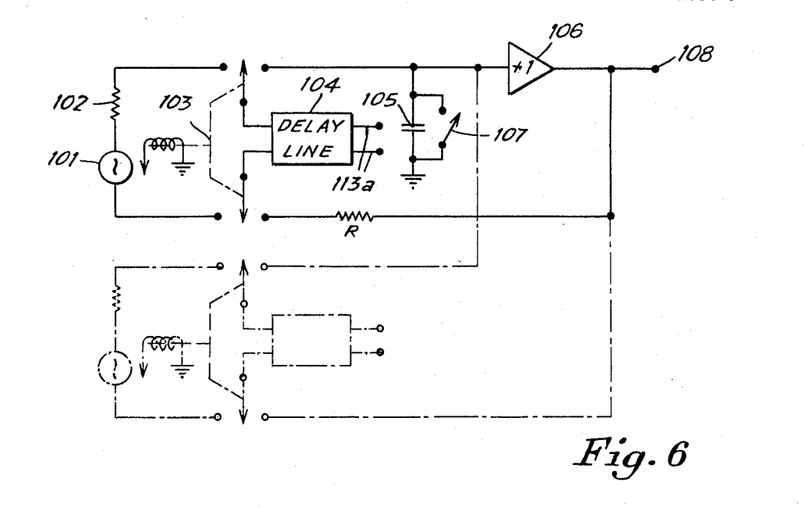
FIGURE 6 shows a modified multiplexer utilizing delay lines and incorporating the basic circuit of FIGURE 1.

A high speed multiplexer circuit employing delay lines is shown in FIGURE 6. Only a single channel of the multiplexer will be discussed in detail since remaining channels are of similar construction. One additional channel is indicated in phantom and more channels can be similarly employed as desired. The characteristic impedance of the delay line is equal to the internal impedance 102 of the information source. If the voltage of the information source is E, then it is well-known from the theory of delay lines that a step equal to ½E propagates down the delay line when switch 103 is moved to the left-hand position. The far end of the delay line is an open circuit at terminals 113a and therefore the step is reflected from the open end back towards the near end. If the voltage of the information source has remained constant during the go-and-return trip of the step, the line is fully charged to the voltage E, and no more current flows. Switch 103 may then be opened, after which the line retains its charge until switch 103 is operated further.

In particular, if switch 103 is moved to the right-hand terminals, all of the charge on the delay line is transferred to capacitor 105. This action is as follows: when the arms of switch 103 are connected to the right-hand terminals, one terminal of the delay line is connected to the input of amplifier 106, and the other terminal is connected to the output of amplifier 106 through resistor R. The sum of the resistance of R and the output impedance of amplifier 106 is equal to the characteristic impedance of delay line 104. Since the voltage gain of the amplifier is unity, the voltage at the lower terminal of delay line 104 differs from the voltage at the upper terminal only by the voltage drop across R and the output impedance of the amplifier. Thus, if the sum of the output impedance of amplifier 104 and the resistance of R is equal to the characteristic impedance of the delay line, the delay line is, in effect, terminated by its characteristic impedance. Therefore, a voltage step of ½E will propagate down the line, be reflected from the open far end, and upon arrival at the near end the delay line will be completely discharged. Thus the time for charging and discharging the delay line is twice the one-way propagation time. Particularly for high accuracies, it can be shown both theoretically and practically that the time required to charge a delay line as described above is substantially less than the time to charge a capacitor. Switch 107 is used to discharge capacitor 105 prior to transferring the charge from the delay line 104 to capacitor 105.

Figure 7:
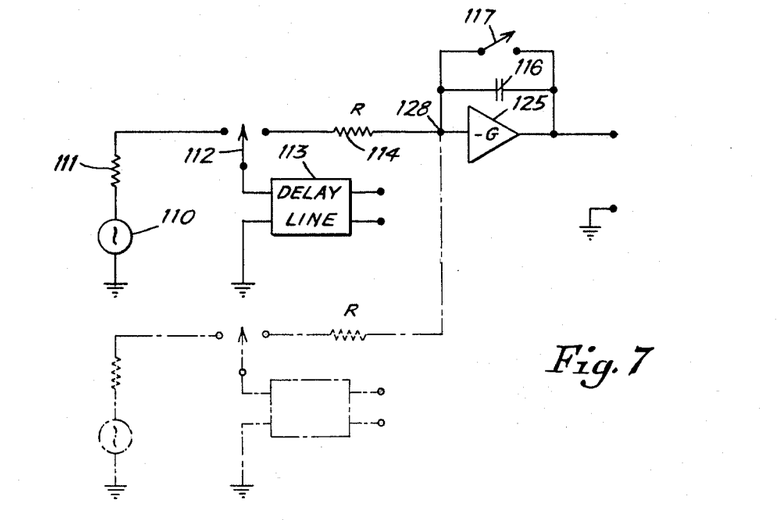
FIGURE 7 shows a modified multiplexer utilizing delay lines and incorporating the basic charge transfer circuit of FIGURE 2.

A delay line may also be used with a high negative gain amplifier type multiplexer, as shown in FIGURE 7. As before, only a single channel will be discussed in detail while an additional channel is shown in phantom. Others may be added as desired. With this circuit, it is necessary that the information source and the delay line be grounded. When switch 112 is operated to the left, the delay line charges up to the voltage of the source as explained previously. When switch 112 is operated to the right, the charge in the delay line is transferred to capacitor 116. There are no reflections on the delay line if resistor 114 is equal to the characteristic impedance of the delay line. The process of charge transfer becomes apparent when it is recognized that point 128 is held essentially at ground potential by the feedback action of amplifier 125. Thus, since charge cannot flow into the amplifier, it must flow into capacitor 116. Therefore, when switch 112 is in the right-hand position, the delay line ends up with no charge, and the charge which formerly was on it is transferred to capacitor 116. As before, resistor 114 is used for discharging the delay line.

Figure 8:
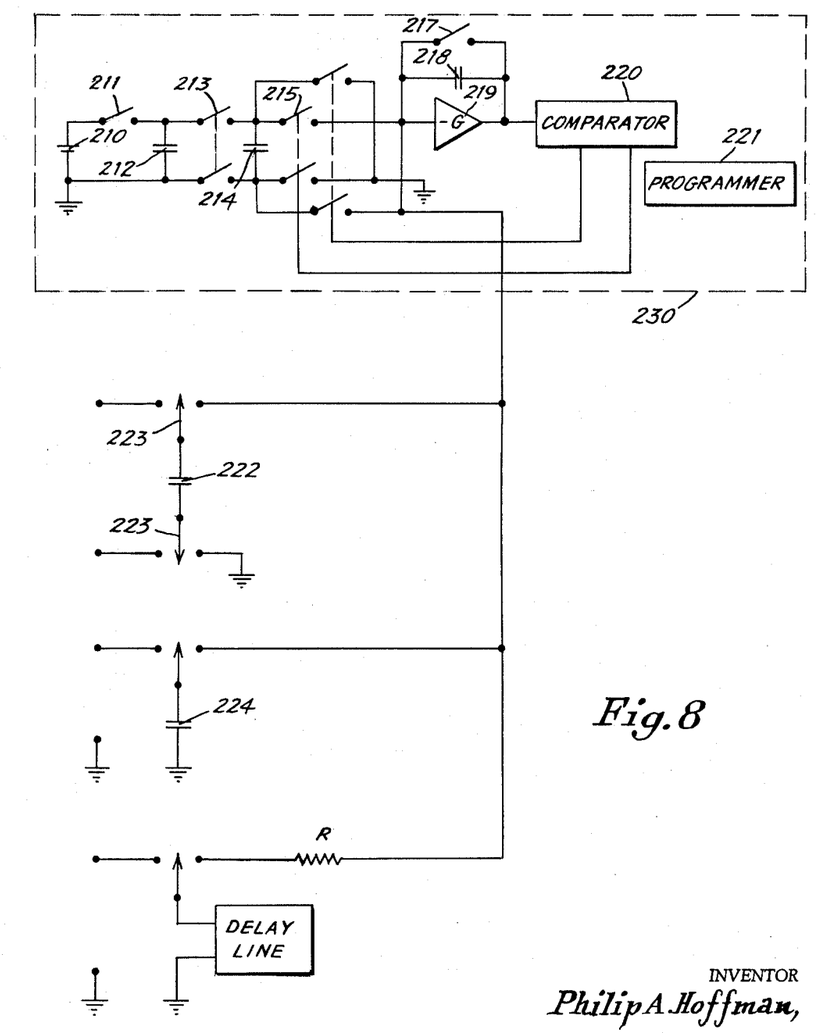
FIGURE 8 shows a combination multiplexer-converter circuit constructed in accordance with the present invention.

Another advantage of the multiplexer shown in FIGURE 7 is that there is a saving of components when it is used with some of the anlog to digital converters in co-pending application Serial No. 25,343 of which the present application is a continuation-in-part. In particular, for the circuit in FIGURE 4, the capacitor 78 and the amplifier 77 are common to both the multiplexer and the converter. A circuit for the combined multiplexer and converter is shown in FIGURE 8, and a corresponding combined circuit is evident for the circuit in FIGURE 3. In FIGURE 8, capacitor 218 is first discharged by the closing and opening of switch 217. Thereafter, the charge on capacitor 222 is transferred to capacitor 218 in accordance with the previous description. The components enclosed by dashed lines 230 then operate as an analog to digital converter to digitize the charge on capacitor 218. Upon completion of the encoding cycle, switch 217 is closed and opened in order to eliminate any residual charge on capacitor 218, and then the charge on capacitor 224 is transferred to capacitor 218 and digitized. These operations are continued as many times as there are input channels to the multiplexer portion of the device. It will be noted that the third channel in FIGURE 8 utilizes a delay line, and that the lower two information sources are grounded, that is, the sources which are connected to capacitor 224 and the delay line are grounded.

In operation of the converter 230, voltage source 210 applies a reference voltage signal to charge up capacitor 212 through momentarily closed switch 211. Subsequent to the opening of switch 211, leaving the reference voltage charge on capacitor 212, gang switch 213 is closed. The charge on capacitor 212 is distributed between capacitors 212 and 214 to produce a predetermined and usually equal voltage across these two capacitors. Switch 213 is then opened and the portion of the distributed charge on capacitor 214 is completely transferred to capacitor 218 through reversing switch 215. Timing of the various switches is controlled by a programmer 221. Comparator 220 senses the polarity at the output of amplifier 219 and controls reversing switch 215 so that if the output from amplifier 219 is one polarity, the charge on capacitor 214 is added to the charge on capacitor 218, and if the other polarity, the charge is subtracted from capacitor 218. Switch 217 may be closed at the end of an encoding period to discharge capacitor 218.

It is desirable, when combining the multiplexer and converter circuits, to utilize an amplifier of the same type in both the converter and multiplexer systems so that the amplifier may be utilized in common to both the multiplexer and converter systems. While FIGURE 8 illustrates a multiplexer-converter combination utilizing a negative high gain amplifier 219, the combination using a common +1.0 gain amplifier of the type illustrated in FIGURES 1 and 3 is readily apparent.

It is clear from the above that the present invention provides a novel multiplexer system having significant advantages over known multiplexers with respect to permissible information source impedances and voltage levels as well as freedom of selection of different gains for different channels. The multiplexer of the present invention permits the simultaneous sampling of information sources with a high degree of accuracy. Substantial increases of speed are brought about through the utilization of delay lines in the system of the present invention, which delay lines may be charged and discharged to a much higher accuracy at greater speeds than simple capacity storage elements.

The multiplexer is useful for a wide variety of input source impedances and frequencies. In some instances, the utilization of an electrical delay line for intermediate signal storage provides additional advantages.

For input sources in which one terminal is grounded, two electronic switches per channel are provided. For floating input sources, two dual switches per channel are required. The unit can accommodate, if desired, a mixture of both grounded and floating input channels.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An electronic multiplexer comprising at least two electrical signal storage circuits, at least one of said circuits having the properties of a low pass filter, a common output terminal, means for connecting each of said storage circuits to an electrical output information signal source whereby a stored charge is produced in said storage circuits representative of the source signals, and means for individually coupling said storage circuits to said common output terminal in time sequence, said coupling means including a charge transfer circuit for removing all the stored charge from said circuits.

2. An electronic multiplexer according to claim 1, wherein said one storage circuit is a delay line.

3. An electronic multiplexer comprising at least two intermediate charge storage circuits, at least one of said circuits having the properties of a low pass filter, a third charge storage device common to said two intermediate circuits, means connecting said third storage device to a common output terminal, means for connecting each of said intermediate circuits to an electrical output information signal source whereby a stored charge is produced on said intermediate circuits representative of the source signals, and means for individually coupling said intermediate charge storage circuits to said third device in time sequence, said coupling means comprising a charge transfer circuit including an amplifier for transferring all the stored charge from said intermediate circuits to said third storage device.

4. An electronic multiplexer according to claim 3 wherein said amplifier has a high negative gain.

5. An electronic multiplexer comprising a pair of charge storing electrical delay lines, a charge storage capacitor common to said delay lines, an amplifier having a high negative gain connected across said capacitor and to a common output terminal, switch means for connecting each of said delay lines to an electrical information signal source whereby a stored charge is produced on each of said delay lines representative of the signal from the source to which it is connected, and switch means for connecting said delay lines to said capacitor in time sequence, said capacitor and said amplifier forming a charge transfer circuit whereby all the stored charge on said delay lines is transferred to said capacitor.

6. An electronic multiplexer comprising an intermediate charge storing capacitor, a charge storing electrical delay line, a common output terminal, means for individually connecting said intermediate capacitor and said delay line to an electrical output information signal source whereby a stored charge is produced on said intermediate capacitor and said delay line representative of the source signals, a second charge storage capacitor coupled to said common output terminal, and means for coupling said intermediate capacitor and said delay line to said third capacitor in time sequence, said coupling means comprising a charge transfer circuit including an amplifier for transferring all the stored charge on said intermediate capacitor and said delay line to said second capacitor.

7. An electronic multiplexer according to claim 6 including an additional intermediate capacitor and switch means connecting said additional capacitor to an information signal source and to said second capacitor.

8. An electronic multiplexer according to claim 6 wherein said amplifier has a high negative gain.

9. A combination multiplexer-converter comprising at least two intermediate charge storage devices, a third charge storage device common to said two intermediate devices, means connecting said third storage device to a common output terminal, means for connecting each of said intermediate devices to an electrical output information signal source whereby a stored charge is produced on said intermediate devices representative of the source signals, and means for individually coupling said intermediate charge storage devices to said third device in time sequence, said coupling means comprising a charge transfer circuit including an amplifier for transferring all the stored charge from said intermediate devices to said third storage device, a pair of converter charge storage devices, means for producing a reference charge on one of said converter devices, means for connecting said converter devices together in charge sharing relation whereby a predetermined portion of said reference charge is transferred to the other of said converter devices, and means for connecting said other converter device to said third storage device whereby all the charge on said other converter device is transferred to said third storage device.

10. A combination multiplexer-converter comprising at least two intermediate charge storage devices, a third charge storage device common to said two intermediate devices, means connecting said third storage device to a common output terminal, means for connecting each of said intermediate devices to an electrical output information signal source whereby a stored charge is produced on said intermediate devices representative of the source signals, means for individually coupling said intermediate charge storage devices to said third device in time sequence, said coupling means comprising a charge transfer circuit including an amplifier for transferring all the stored charge from said intermediate devices to said third storage device, a pair of converter charge storage capacitors, means for producing a reference charge on one of said converter capacitors, first converter switch means for periodically connecting said converter capacitors in charge sharing relation whereby a predetermined portion of said reference charge is transferred to the other of said converter capacitors, second converter switch means for periodically connecting said other converter capacitor to said third storage device, a comparator coupled to the output of said amplifier, said comparator actuating said second converter switch means in accordance with the polarity of said amplifier output.

11. A combination multiplexer-converter according to claim 10 wherein at least one of said intermediate storage devices is a capacitor.

12. A combination multiplexer-converter according to claim 10 wherein at least one of said intermediate storage devices is an electrical delay line.

13. A combination multiplexer-converter according to claim 10 wherein said third storage device is a capacitor, and said amplifier has a high negative gain said second converter switch means comprising a two-sided reversing switch for reversing the connection between said other converter capacitor and said third storage device, said comparator actuating one or the other of said switch sides in response to the polarity of said amplifier output.

14. An electronic multiplexer-converter comprising a pair of converter charge sharing capacitors, means for producing a reference charge on one of said sharing capacitors, means for connecting said sharing capacitors together in charge sharing relation whereby a predetermined portion of said reference charge is transferred to the other of said sharing capacitors, a third capacitor, a charge transfer circuit for transferring all the charge on said other sharing capacitor to said third capacitor, a plurality of analog signal input storage means, means for impressing the signal from said analog input storage means on said third capacitor, said charge transfer circuit including a high negative gain amplifier connected across said third capacitor, said analog input storage means including a fourth and fifth capacitor, and switch means connecting said fourth and fifth capacitor to said third capacitor for transferring all of the analog input signal charge on said fourth and fifth capacitor to said third capacitor.

References Cited by the Examiner
UNITED STATES PATENTS

| | | | |
|---|---|---|---|
| 2,691,727 | 10/54 | Lair | 340—173 X |
| 2,729,812 | 1/56 | Jahn | 340—347.1 |
| 2,817,704 | 12/57 | Huntley | 340—347 |
| 2,907,902 | 10/59 | McIntosh et al. | 320—1 X |
| 2,915,705 | 12/59 | Sweet | 320—1 X |
| 2,932,017 | 4/60 | Prince | 340—347.1 |
| 2,937,369 | 5/60 | Newbold et al. | 324—111 X |
| 2,977,536 | 3/61 | Hindel | 320—1 |
| 3,059,220 | 10/62 | Dimeff | 320—1 |
| 3,084,321 | 4/63 | Hinrichs et al. | 320—1 |
| 3,098,224 | 7/63 | Hoffman | 340—347 |

IRVING L. SRAGOW, *Primary Examiner*.

STEPHEN W. CAPELLI, *Examiner*.

UNITED STATES PATENT OFFICE
CERTIFICATE OF CORRECTION

Patent No. 3,193,803                         July 6, 1965

Philip A. Hoffman

It is hereby certified that error appears in the above numbered patent requiring correction and that the said Letters Patent should read as corrected below.

Column 2; lines 64 to 66, the equation should appear as shown below instead of as in the patent:

$$\frac{C_1}{C_2} e_1 + e_0$$

column 8, line 2, for "anlog" read -- analog --; column 10, line 55, after "capacitor" strike out the comma; line 56, after "gain" insert a comma.

Signed and sealed this 22nd day of February 1966.

(SEAL)
Attest:

ERNEST W. SWIDER                           EDWARD J. BRENNER
Attesting Officer                               Commissioner of Patents